United States Patent Office 2,716,649
Patented Aug. 30, 1955

2,716,649
ACID PASTING OF PHTHALOCYANINE PIGMENTS

Robert E. Brouillard, Westfield, N. J., assignor to General Aniline & Film Corporation, New York, N. Y., a corporation of Delaware No Drawing. Application June 5, 1951,
Serial No. 230,084

8 Claims. (Cl. 260—314.5)

The present invention relates to a process for conditioning phthalocyanine pigments, and more particularly to an acid pasting procedure which produces phthalocyanine pigments whose particle size, particle size distribution and particle surface characteristics render them exceedingly suitable for pigmentation of surface coatings.

Organic pigments are generally obtained as large coarse crystals or highly agglomerated amorphous masses. If these be applied as such, i. e. without modification, they possess very poor application properties and tinctorial values. It is, therefore necessary, in order to develop fully the coloristic potential and working properties of the pigments, to so modify their nature that the particle characteristics are rigidly controlled.

Various methods have been developed for the conditioning of phthalocyanine pigments, the most important being that known as acid pasting. Such acid pasting may be accomplished by two general methods. The first method involves solution of the pigment in concentrated acid followed by precipitation of the pigment by drowning the acid solution in water. The second method involves slurrying the pigment in a large volume of acid having a concentration insufficient to effect appreciable solution followed by precipitation by drowning in water.

These two processes suffer from the disadvantages in that they require large quantities of acids which are generally of an extremely corrosive nature. In addition to this unfavorable economic factor, the use of such volumes of acid poses problems in industrial hygiene and safety, as well as an extremely serious and costly disposal problem.

A further factor militating against the adoption of such procedures is that the quality of the products obtained varies from run to run and is often unsatisfactory for particular applications.

Operators have recognized these disadvantages and have proposed to overcome them by modifying the conventional acid pasting procedures. To this end it is suggested in United States Letters Patent No. 2,334,812 to drown the acid solution of the pigment in water under conditions described as "turbulent flow."

While this modification has led to improvements in specific properties, these improvements invariably have been accompanied by degradation in other properties. More important still is the fact that these modifications have failed to obviate the basic economic and handling problems inherent in the previous acid pasting procedures.

Suggestions have also been made with regard to the use of conditioning methods which avoid acid pasting. One such suggestion appears in United States Letters Patent No. 2,402,167 and involves the creation of small particles by grinding under suitable conditions. Such procedures have serious operational disadvantages and involve high manufacturing costs. When this factor is added to the fact that the pigments conditioned in this way show no advantages over those obtained by acid pasting, it is manifest that such methods have not met with the approval of the trade.

The purposes and objects of the present invention are constituted by the provision of a dyestuff acid pasting method which yields products of optimum particle characteristics while avoiding the unfavorable economic hygiene and safety factors of previous methods, as well as the extremely serious and costly disposal problem inherent in such methods.

My process in its essence involves bringing together a phthalocyanine pigment in a substantially dry state with a relatively small amount of a strong acid, milling the mixture to effect substantially uniform shear throughout the mass and drowning the resulting thick magma in water. The aqueous mixture is then filtered and washed acid free.

One of the most essential features of this procedure is the quantity of acid which is employed. It has been stated that the quantity of acid is relatively small. It is to be emphasized that such qantity is only that necessary to convert the pigment employed, into a doughy, kneadable mass. The particular quantity of acid which will give this result can be readily ascertained by experiment.

Thus, if the quantity is too small, the pigment does not wet out completely. Too great a quantity of acid, on the other hand, does not give adequate shear, and leads to lumpy masses in which the acid does not contact all pigment particles. The quantity of acid will generally be within the range of about 2 parts to 5 parts for each part of the phthalocyanine pigment.

It is possible to vary the pigment-acid ratio after the mass has been under shear, in order to improve the ease with which the mill may be discharged. Observance of the aforestated condition, however, is necessary when the shearing action is originated in order to obtain the desired result.

The acid which is employed is a strong, normally liquid, non-oxidizing acid. Suitable acids in this category are chloracetic, phosphoric, sulfuric, chlorsulfonic and alkylsulfonic acids, such as methyl sulfonic, ethyl sulfonic and the like. Best results, however, are obtained with sulfuric acid and the use of this acid is, therefore, preferred.

The particular concentration of the acid used will vary with the particular pigment treated. Generally speaking, however, the concentration will range from 68 to 100%. Simple tests will be sufficient to indicate the specific concentration within this range which will give optimum results. Thus it may be said that if the acid used is sulfuric acid and the pigment is copper phthalocyanine, best results accrue with a concentration of acid ranging from 68 to 72%. A concentration of 95 to 100% sulfuric acid gives best results where the pigment is hexadecachloro copper phthalocyanine. It is, therefore, to be emphasized that while the results of my invention will be obtained by using strong, liquid, non-oxidizing acid having a concentration within the range of 68 to 100%, optimum results are obtained by varying the concentration within this range to suit the particular pigment treated.

The particular apparatus used for effecting the milling of the pigment-acid mass must be one capable of exerting a substantially uniform shearing action throughout the mass. Any apparatus capable of so operating is suitable. I prefer to use a Werner-Pfleiderer type of mill, but others of this general type, as well as mills which introduce uniform shearing by extrusion, may also be employed.

It is to be emphasized, however, that ball mills are not suitable for the reason that they are incapable of effecting uniform shearing action throughout the mass at the viscosities at which my procedure operates. In this connection reference may be made to Detrick et al. U. S. Patent No. 2,284,685 granted June 2, 1942 which describes the purification of phthalocyanines by treating them with concentrated sulfuric acid to form a sulfate, isolating the sulfate in crystalline form, dissolving the sulfate in concentrated sulfuric acid and drowning the solution in water.

Example 5 of the patent discloses such treatment applicable to copper phthalocyanine, while using one part of copper phthalocyanine to 15 parts of 80% sulfuric acid, and while working up the mass in a ball mill for 12 hours. It is inferred at the bottom of page 2 of the patent that the ratio of pigment to acid in this and other examples may be as low as 6 parts of acid to one part of pigment.

I have carried out tests in connection with the procedure of the patent, with the results indicated in the table below:

TABLE

| 80% $H_2SO_4$/Copper Phthalocyanine | Viscosity* (centipoise) | Ball Milling Characteristics |
|---|---|---|
| 14/1 | 12,500 | OK. |
| 13/1 | 13,500 | OK. |
| 12/1 | 13,500 | OK. |
| 11/1 | 12,500 | OK. |
| 9/1 | 35,000 | Only with heavy steel balls. |
| 8/1 | >50,000 | No milling. |
| 7/1 | >50,000 | Do. |

*Determined with Brookfield Synchro-Electric Viscosimeter (model LVF).

This table shows that when the ratio of acid to pigment becomes as low as 8:1, it is impossible to effect ball milling of the mass. This is attributable to the fact that with this ratio the mass has a viscosity of more than 50,000 centipoises.

It is manifest from the above results that milling as required by the patentee, let alone uniform shearing throughout the mass, is impossible with a ball mill when the ratio of acid to pigment is less than 9:1.

The temperature of the acid milling may vary over a considerable range and may, in fact, be any temperature within the range from just above the melting point of the ingredients to just below the boiling point thereof. I prefer, however, for reasons of economy, to operate within the range of 20 to 50° C. for the reason that within this range unjacketed tools may be employed.

My procedure is suitable for the conditioning of any phthalocyanine such as metal-free phthalocyanines, copper phthalocyanine, hexadecachloro copper phthalocyanine, aluminum phthalocyanine, hexadecachloro aluminum phthalocyanine and the like.

One of the remarkable features of my invention is the milling time necessary to achieve conditioning of the pigment. It is thus possible to mill for as little as five minutes to achieve conversion. On the other hand, milling for as much as five hours gives excellent results. It is preferable to use a short milling time because by so doing it is possible to achieve remarkably high rates of production with relatively small equipment.

Another advantage which my process possesses is its successful application to pigments which are unstable to conventional acid pasting. Thus, whereas solution of metal-free phthalocyanines in sulfuric acid leads to the partial destruction thereof, such products are converted by my method into excellent pigments.

Still another advantage of my invention is the exceedingly high solids content in the press cakes obtained by filtering the drowned mass. According to the usual practice in the acid pasting of phthalocyanine pigments, the press cakes obtained have a solids content amounting to only about 25%. According to my procedure, however, the solids content of the press cakes amount to from about 40 to 60%.

The importance of such high solids content is self-evident. Thus, handling problems are minimized; filter press capacities are greatly increased, and pigment pastes of high concentration are possible without expensive additional operations.

The following examples will serve to further illustrate my invention although it is to be understood that the invention is not restricted thereto. The parts are by weight unless otherwise stated.

*Example 1*

100 parts of hexadecachloro copper phthalocyanine and 300 parts of 96% sulfuric acid were introduced into a Werner-Pfleiderer mill with agitation. The mass was milled for 15 minutes after which it was discharged into 3500 parts of water under vigorous agitation. The slurry which resulted was filtered and the cake washed acid free.

The pigment dyestuff thus obtained could be used without further processing for flushing into oleoresinous vehicles; or it could be dried to give a pigment powder or could be converted into a water dispersible paste with the aid of dispersing agents such as the naphthlene sulfonate-formaldehyde reaction product sold under the trade name "Tamol." In all of these applications the products obtained were superior to currently available commercial standards.

*Example 2*

100 parts of copper phthalocyanine and 250 parts of 70% sulfuric acid were introduced into a Werner-Pfleiderer mill with agitation. The mass was milled for one hour after which it was discharged into 3000 parts of water under vigorous agitation. The slurry which resulted was filtered and the cake washed acid free.

The pigment presscake obtained could be converted as disclosed in Example 1 to give products superior to currently available commercial standards.

*Example 3*

100 parts of hexadecachloro copper phthalocyanine and 350 parts of 95% sulfuric acid were introduced into a Werner-Pfleiderer mill with agitation. The mass was milled for one hour. 150 parts of 95% sulfuric acid was then added slowly. The milling mass was discharged into 6000 parts of water under vigorous agitation. The slurry which resulted was filtered and the cake washed acid free.

The pigment dyestuff obtained had the same characteristics as that obtained in Example 1.

I claim:

1. A process comprising milling with forces predominantly shearing in nature, a mixture comprising a phthalocyanine pigment and a quantity of an acid selected from the group consisting of sulfuric, chloracetic, phosphoric, chlorsulfonic and lower alkyl sulfonic acids, sufficient to produce with the pigment a doughy, kneadable mass, and drowning the milled mixture in water, said acid having a concentration ranging from 68 to 100 per cent by weight and being employed in a ratio of 2 to 5 parts by weight to each part of pigment.

2. The process of claim 1 in which the acid is sulfuric acid.

3. The process of claim 1 in which the pigment is copper phthalocyanine.

4. The process of claim 3 in which the acid is sulfuric acid.

5. The process of claim 4 in which the acid has a concentration of about 70 per cent.

6. The process of claim 1 in which the pigment is hexadecachloro-copper phthalocyanine.

7. The process of claim 6 in which the acid is sulfuric acid.

8. The process of claim 7 in which the acid has a concentration of about 96%.

References Cited in the file of this patent

UNITED STATES PATENTS

| | | |
|---|---|---|
| 1,145,934 | Steindorff | July 13, 1915 |
| 2,284,685 | Detrick | June 2, 1942 |
| 2,367,519 | O'Neal | Jan. 16, 1945 |
| 2,524,672 | Lecher et al. | Oct. 3, 1950 |